United States Patent
Sceery

(10) Patent No.: US 6,442,884 B1
(45) Date of Patent: Sep. 3, 2002

(54) BIRD DECOY SUPPORT AND MOVEMENT DEVICE

(76) Inventor: Edward J. Sceery, P.O. Box 6520, Sante Fe, NM (US) 87502

( * ) Notice: Subject to any disclaimer, the term of this patent is extended or adjusted under 35 U.S.C. 154(b) by 0 days.

(21) Appl. No.: 09/605,196

(22) Filed: Jun. 27, 2000

(51) Int. Cl.⁷ .............................................. A01M 31/06
(52) U.S. Cl. .................................................. 43/2; 43/3
(58) Field of Search ........................... 43/2, 3; 248/481, 248/533, 535, 223.41, 530; 40/765, 749, 124.05, 369, 535–537, 606, 607, 611, 493, 490, 491, 538; 446/487–489; 403/187, 292, 294, 347, 360, 361, 375; D22/125; 52/165

(56) References Cited

U.S. PATENT DOCUMENTS

| | | | |
|---|---|---|---|
| 843,588 A | * 2/1907 | Ditto | 43/3 |
| 2,816,384 A | * 12/1957 | Rexius | 43/3 |
| 4,128,958 A | 12/1978 | Snow | 43/3 |
| 4,322,908 A | 4/1982 | McCrory | 43/3 |
| 4,612,722 A | 9/1986 | Ferrell | 43/3 |
| 4,845,872 A | 7/1989 | Anderson | 43/3 |
| 4,893,428 A | 1/1990 | Gagnon | 43/3 |
| 4,965,953 A | 10/1990 | McKinney | 43/2 |
| 5,065,975 A | * 11/1991 | Giles | 248/545 |
| 5,098,050 A | 3/1992 | Bruns et al. | 248/176 |
| 5,168,649 A | 12/1992 | Wright | 43/2 |
| 5,189,823 A | 3/1993 | Lanius | 43/2 |
| 5,231,780 A | 8/1993 | Gazalski | 43/3 |
| 5,233,780 A | 8/1993 | Overholt | 43/2 |
| 5,274,942 A | 1/1994 | Lanius | 43/2 |
| 5,289,654 A | 3/1994 | Denny et al. | 43/2 |
| 5,375,363 A | 12/1994 | Higdon | 43/3 |
| 5,459,958 A | 10/1995 | Reinke | 43/2 |
| D365,136 S | * 12/1995 | Shaver et al. | D22/125 |
| 5,636,466 A | 6/1997 | Davis | 43/3 |
| 5,678,794 A | * 10/1997 | Kump | 248/220.31 |
| 5,832,649 A | 11/1998 | Kilgore | 43/2 |
| 5,926,990 A | 7/1999 | Okimoto | 43/2 |
| 5,960,577 A | 10/1999 | Walterson | 43/3 |

FOREIGN PATENT DOCUMENTS

| | | | | |
|---|---|---|---|---|
| GB | 9346548 | * | 8/1963 | 43/2 |
| GB | 2189124 | * | 10/1987 | A01M/31/06 |

* cited by examiner

*Primary Examiner*—Peter M. Poon
*Assistant Examiner*—Son T. Nguyen

(57) ABSTRACT

A decoy mounting system enables the support or decoys constructed of thin, flexible materials, such as foam, rubber, PVC, and the like. A ground support stake for supporting the decoy has a semi-circular top portion defining an axially oriented surface and a pointed bottom end. A mounting bracket connects the ground support stake with the decoy and has a socket depending downwardly therefrom to receive the top end of the ground support stake, where the socket defines an axially oriented bore surface effective to engage the axially oriented surface of the ground support stake to limit rotation of the mounting bracket on the ground support stake.

9 Claims, 3 Drawing Sheets

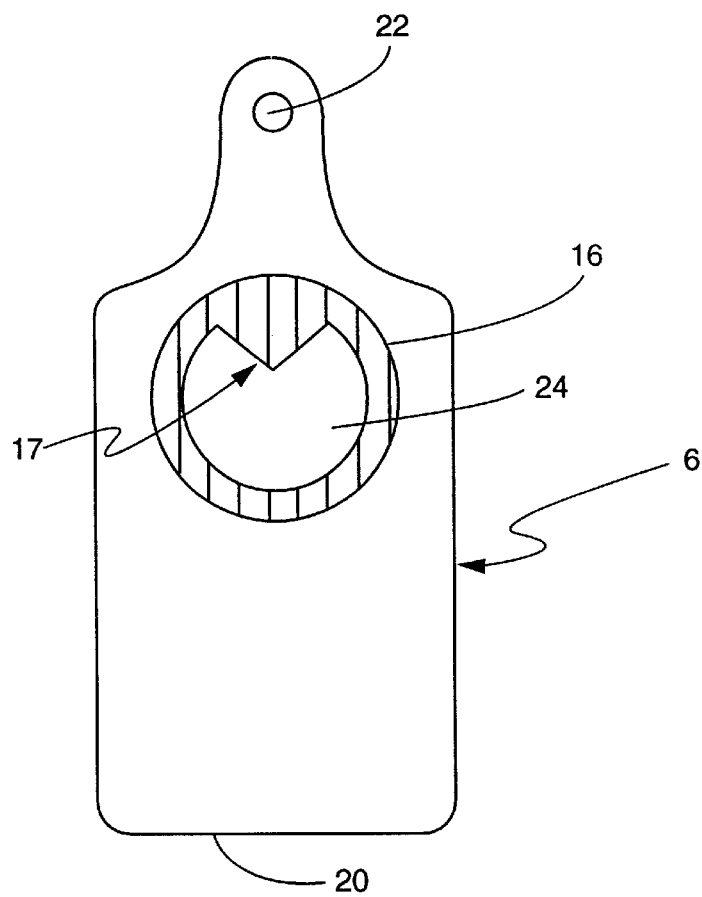
FIG. 5
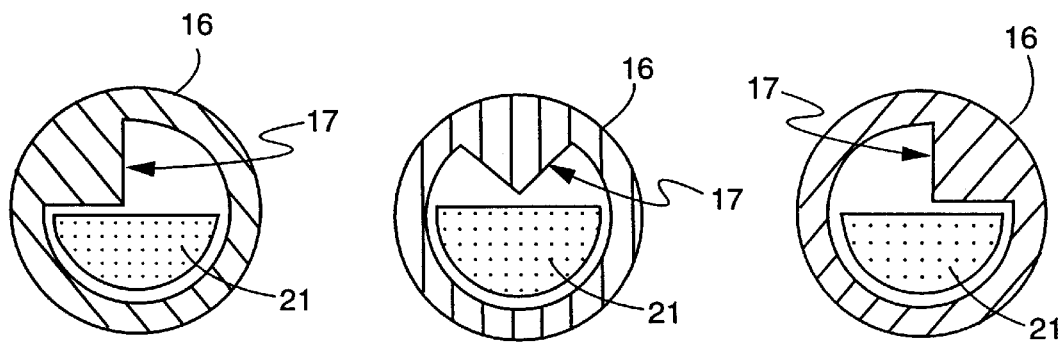
FIG. 6  FIG. 7  FIG. 8

BIRD DECOY SUPPORT AND MOVEMENT DEVICE

FIELD OF THE INVENTION

The present invention relates generally to bird decoys, and, more particularly, to a device that provides a means for decoy support, directional stability, and controlled movement.

BACKGROUND OF THE INVENTION

Hunters and wildlife photographers use decoys as a means to attract wild animals. It is widely accepted that decoys equipped with a device providing for movement can be more effective in attracting wildlife than stationary decoys. Duck, goose and turkey decoys are among the most common bird decoys in use. They are constructed in various designs and of different materials. At present, many commercially produced decoys are constructed of a rigid synthetic material, such a plastic, and are hollow shells with a large openings on their underside. Decoys of this design allow direct access to their rigid interior for the attachment of movement devices and supporting stakes. Among the more recent developments in decoys are those constructed of thin flexible materials, such as foam or rubber, and those of PVC which are designed to be inflatable. An advantage of these decoys made of flexible materials is that they can be compressed and folded into a compact size for transport by the hunter. A disadvantage of these newer decoys is the lack of innovative devices for support and movement.

Due to their usefulness, many devices have been invented to provide support and movement to decoys. Often, these inventions are complex and expensive to produce. Notably, many of these prior art inventions were designed to be fitted within the body cavity of a decoy, and require a fixed, rigid attachment by the use of screws and other fasteners, to the rigid walls of the decoy body. Examples of such movement devices are shown described in U.S. Pat. No. 4,965,953, to McKinney; U.S. Pat. No. 5,274,942 to Lanius; and U.S. Pat. No. 5,289,654, to Denny.

The most common, simplest, and least expensive method of providing support and/or movement to a decoy is by use of a vertical pin, pointed at both ends, which is often called a support stake. One end of the stake is pressed into the ground by the user. A decoy shell is placed over and balanced upon the opposite, top end of the support stake. Typically, the stake extends vertically through a hole, or opening, on the underside of the decoy and extends up through the hollow decoy body to an attachment point on the inner top surface, where it is free to pivot. These simple, vertical pins provide for support, balance, and decoy movement from wind action. One commercially marketed foam decoy utilizing this a simple staked supporting device, and pointed at both ends, is presently sold under the registered name, Feather-Flex. The pointed upper end presents a potential source of danger to the user when forcing the pin into the ground. In addition, decoys using the simple vertical pin for support often lean or wobble, unnaturally, from side-to-side. Further, they lack a means to provide manual or motorized movement. Another problem with the simple pin design is that it is often difficult to manually align a long stake through the hollow interior of the decoy. Basically, the hunter is "working blind" as he attempts to thread the long pin through the hollow decoy body and properly align it with a slot, hole, or socket on the inside, top surface of a hollow decoy.

While this simple stake device allows for movement of a decoy from wind forces, a common problem encountered with such a support system is that the decoy is free to pivot circumferentially, or rotate in an unrestricted and unnatural manner, and no directional control is possible. One of the attempts at solving a directional control problem may be seen in the Gagnon patent, U.S. Pat. No. 4,893,428. The Gagnon decoy appears to spin freely on the supporting stake, with directional control provided by the wind using an externally mounted, vertical fin. A vertical fin, constructed much like the tail of an airplane, adds an unnatural feature to a bird decoy. In addition, in the absence of wind, directional control appears lacking. It would be an improvement to devise a stake supporting device that would both provide for support and directional control without the added use of an unnatural appearing, vertical fin, and also a device that provided for manual or motorized movement in the absence of wind. As with many prior art devices, the Gagnon decoy appears to require access to an interior decoy surface, and also a rigid mounting surface. Reinke, in U.S. Pat. No. 5,459,958, shows a mount, or socket, for a vertical support stake, requiring a screw for attachment to the rigid, inner surface of a hollow, flexible turkey decoy. The teachings of Reinke would not be adaptable to a sealed inflatable decoy containing compressed air, due to the lack of access to the interior of an inflatable decoy. Further, the use of a screw through the exterior surface for attaching a securing cap or socket would not be suitable for an inflatable decoy. Many other, similar problems are encountered when applying prior art, decoy support and movement devices, to inflatable decoys. Many of these devices require an inner surface for mounting, and a rigid point of attachment. An externally attached decoy supporting mechanism that did not require a fixed attachment by use of screws or other fasteners would be a unique, novel improvement.

In view of the deficiencies in prior art and in light of the newer type of inflatable decoys, a need has arisen for an improved support and movement system that does not require a fixed, rigid body surface for attachment, one that can be easily attached and detached from an exterior surface without the use of screws or similar fasteners, one that will provide movement and directional stability with or without the presence of wind.

It would be an improvement to have a decoy support and movement device that could be readily adapted for use on decoys of thin flexible materials, that was inexpensive and non-complex, one that is particularly distinguishable from prior art in that it could be easily attached to, and detached from, the exterior surface of a decoy without the use of screws or other similar fasteners, and one that would provide both directional control and natural movement. Further, such a novel device would be particularly useful to a bird hunter if a naturally appearing, side-to-side movement, could be obtained from either the wind, or a remote manually operated string, and suited for use on decoys lacking a rigid mounting surface and lacking access to their interior, such as those decoys of inflatable PVC design.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a decoy mounting system. A ground support stake for supporting the decoy has a semi-circular top portion defining an axially oriented surface and a pointed bottom end. A mounting bracket connects the ground support stake with the decoy and has a socket depending downwardly therefrom to receive the top portion of the ground support stake, where the socket defines an axially oriented bore surface effective to engage the axially oriented surface of the ground support stake to limit rotation of the mounting bracket on the ground support stake.

The primary object of the invention is to provide a decoy supporting device which can be quickly and easily attached to, and detached from, the exterior surface of a decoy without the use of screws or other metal fasteners. The decoy is constructed with an exterior receptor slot on the lower body which is sized to accept a rigid, slide-in, support mounting bracket. Thus, the support bracket can be quickly and easily attached to the decoy and provide for connection to, and support of, the decoy without the use of screws or other metal fasteners. The full connection, clearly visible to the user, eliminates the manual alignment problems of prior art internal stake supports. The support mounting bracket is generally, paddle shaped with a downward projecting socket, but within the scope of this invention may have alternate shapes which allow for a relatively wide mounting surface. The wide-based, support mounting bracket, when inserted into the decoy receptor slot, minimizes unnatural, side-to-side leaning of the decoy. The downward projecting socket provides for acceptance of the ground support stake.

Another object of the invention is to provide a single means for providing support, directional stability, and side-to-side controlled, turning movement. Controlled movement is obtained through interaction of the support mounting bracket and the ground stake. The interior of the support mounting bracket socket contains a longitudinal ridge projecting inward from the side of the interior socket bore. The upper portion of the ground stake is semi-circular. When assembled, interaction between the socket ridge and the top semi-circular portion of the ground stake allows for a ninety degree, side-to-side turning movement from wind action, but further and more importantly, acts as a stop to prevent the decoy from spinning. This improvement over prior art solves the commonly encountered problems of unnatural 360 degree spinning of decoys without the necessity of added parts, such as an externally mounted fin or a rigid attachment of the supporting stake. Alterations in the size of the socket ridge and the semi-circular portion of the stake may be made for altering the degree of side-to-side turning. Other alterations may be made to provide for a natural rocking motion seen in feeding birds. Such alterations remain within the scope of this invention.

The controlled, ninety degree side-to-side turning movement of the decoy is particularly useful to hunters when two or more decoys are used simultaneously, at one set, and initially placed to face in different directions. The resulting, independent, controlled movement of the decoys will be evident to the user and particularly attractive to nearby birds. With the decoys placed facing in different directions, action of the wind will result in one or two birds moving, while one or two will remain stationary. In other words, not all decoys will move at the same time, but only a portion of those placed out will move. This results in natural "flock action" and is a considerable improvement over prior art decoy supporting stakes that allow all decoys, at one set, to spin freely and uncontrolled upon their support stakes.

Another object of the invention is to provide a decoy with alternate means of movement. The support mounting bracket contains a hole, placed at the aft end, that provides the user an attachment point for the end of long string. This improvement eliminates the need to provide an attachment point on the decoy body. By remote, manual operation, the user may manipulate the string and thereby turn the decoy a maximum of ninety degrees. An additional benefit of this herein described invention, not found in prior art, and which will become apparent to those skilled in the art, is the ease at which an electrically operated movement device can be incorporated into this device, where an electrically operated movement device is placed between the support mounting bracket and the support stake or below the support stake. This would provide for the easy attachment of electrically operated movement devices to decoys lacking access to the inner body of the decoy, the need of a rigid decoy surface for attachment, or the use screws or other similar fasteners as commonly seen in prior art mechanical movement devices.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 5 is a bottom perspective view of the support mounting bracket.

FIG. 6 is a horizontal cross section of the assembled mounting support bracket and support stake taken at 2—2, illustrating forward neutral position of support bracket.

FIG. 7 is a horizontal cross section of the assembled mounting support bracket and support stake taken at 2—2, illustrating support bracket turned to full left position FIG. 8 is a horizontal cross section of the assembled mounting support bracket and support stake taken at 2—2, illustrating support bracket turned to full right position

DETAILED DESCRIPTION

Figure 1:
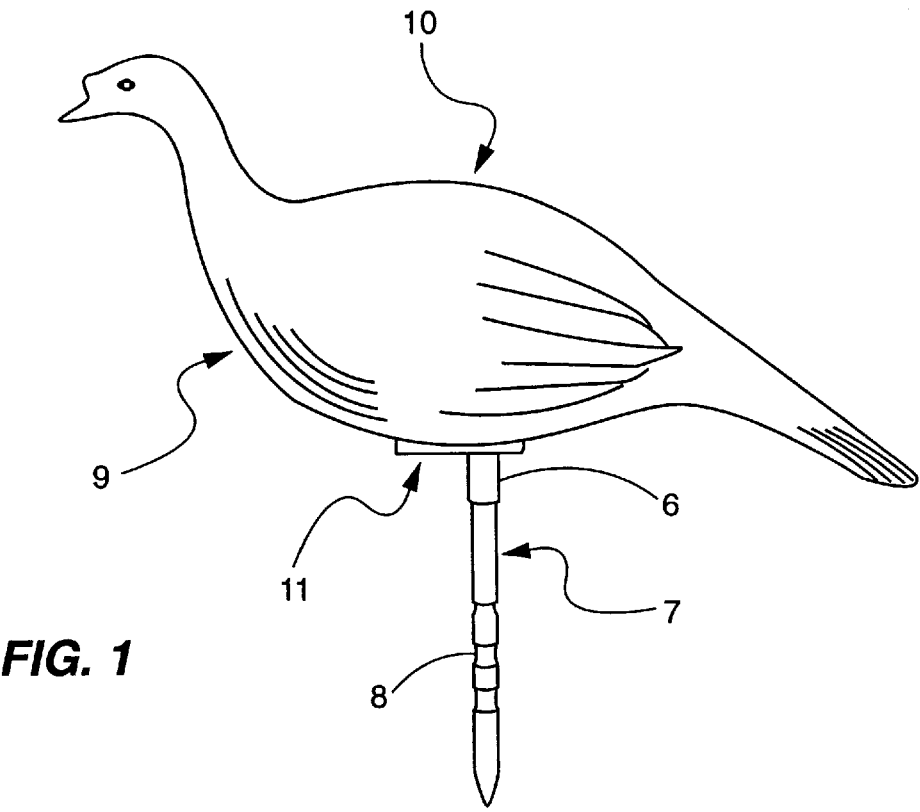
FIG. 1 is a side elevation view of an inflatable turkey decoy constructed with and embodying the present invention.

Referring to the drawings, the decoy support and movement device of this invention is shown generally in FIG. 1. The device 10 consists of three main parts, namely a bird decoy 9 with an attached bracket receptor 11, a support mounting bracket 6, and a support stake 8. The decoy is preferably made of PVC material and is designed to be inflatable, but this invention may be adapted for use on decoys made of other materials and decoys which are not inflatable.

Figure 2:
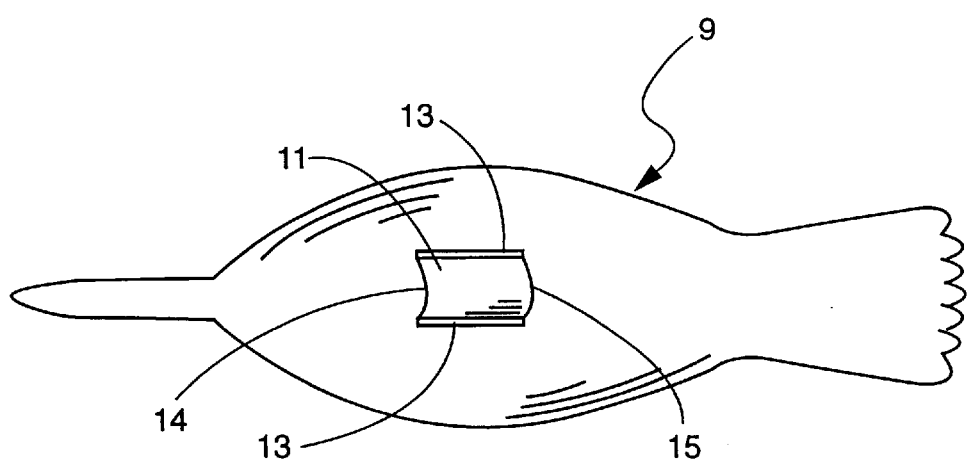
FIG. 2 is a bottom view of an inflatable turkey decoy, illustrating the mounting bracket receptor slot.
Figure 3:
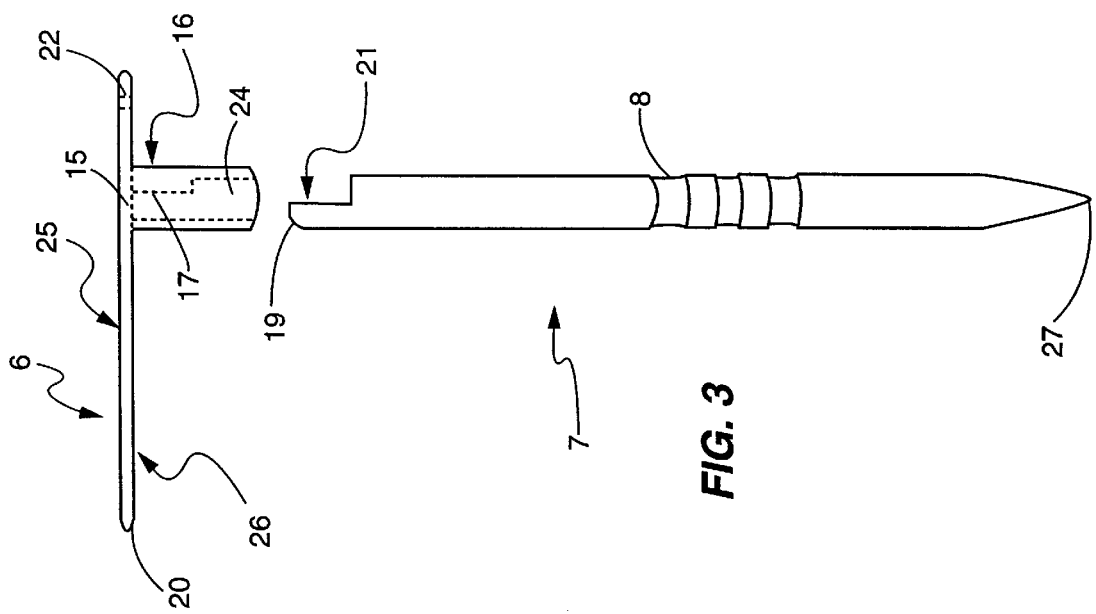
FIG. 3 is a perspective view of the assembled support mounting bracket and support stake.

Referring to FIGS. 2 and 3, the decoy 9, includes a bracket receptor 11, on the bottom portion, forming a slot, which serves as a receptor for the forward portion 20 of the support mounting bracket 6. The bracket receptor 11 preferably consists of a rectangular piece of PVC material, positioned on the center, lower exterior portion of the decoy body 9, so that the point of balance, of the decoy body 9, will be directly above the supporting stake 7, when assembled, as shown in FIG. 1. The bracket receptor 11 is attached and preferably joined, on each side 13, to the decoy body 9 by welding of the PVC material during manufacture. Both the fore 14 and aft 15 ends of the bracket receptor remain unattached to the decoy body 9.

Bracket receptor 11 is formed to define a slot with "U" shaped edges effective to hold and support mounting bracket 6. The opening, or slot, formed by the bracket receptor 11 will slidably receive, at aft end 14, the forward portion 20 of the support mounting bracket 6. The outwardly extending wall of the inflated decoy 9 exerts pressure on, and limits the size, of the slot formed between the bracket receptor 11 and the decoy body 9. This serves to provide a relatively secure attachment of the support mounting bracket 6. When compared to prior art devices, users will appreciate the relative ease of attachment. This will be particularly evident to users during the dark, pre-dawn hours, when many hunters place decoys in the field.

Figure 4:
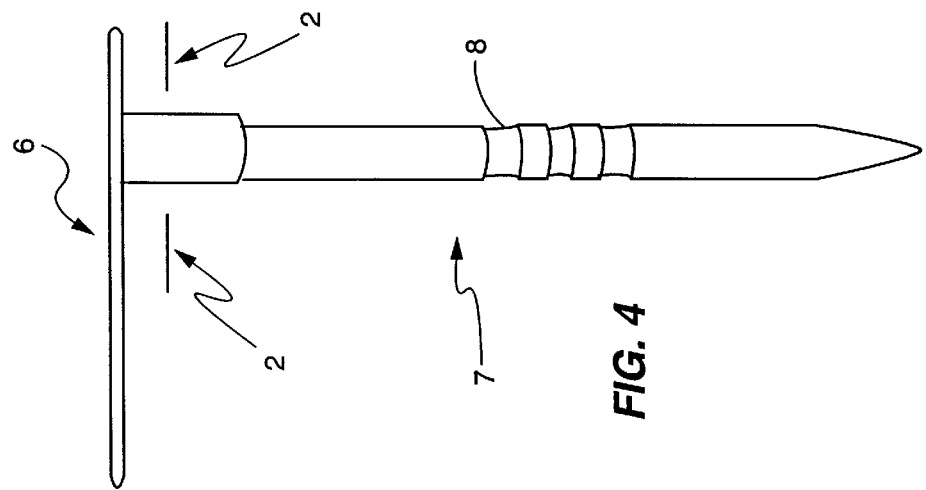
FIG. 4. is a horizontal center cross section of the unassembled mounting support bracket and support stake.

Referring to FIGS. 3, 4 and 5, the support mounting bracket 6, is paddle-shaped and preferably manufactured of a plastic material with a generally wide and flat upper 25 and lower 26 surface, and sized to slidably fit securely within the bracket receptor 11. Thus, the secure attachment of the support mounting bracket 6 within the slot formed by the bracket receptor 11 eliminates the need for screws or other similar fasteners for attachment of a decoy support and movement device. This improvement will be appreciated by those who use the improved device 10, and also by those who manufacture and sell decoys, as the cost of manufacture and labor will be significantly reduced over prior art devices that required screws or other metal fasteners for attachment of supporting devices.

As can be seen in FIGS. 3 and 4, located on the lower surface 26, generally toward the aft end of the support mounting bracket 6 is a downward projecting socket 16, and further aft, a hole 22 extending between the upper 25 and lower 26 surfaces. The hole 22 serves as an attachment point for a string that can be used to manually provide side-to-side movement to the bracket receptor 11 and the decoy 9, which it supports. This feature will be useful to hunters wishing to add movement to the decoy. The support bracket socket 16, is generally cylindrical, characterized by an internal bore 24, and serves as a receptor for the stake 7. The socket 16 is further characterized by an internal, axially oriented bore surface 17. Bore surface 17 is oriented axially on the inner bore of the socket 16, and projects toward the center of inner bore 24, as shown in the cross sectional view in FIG. 4. Further, bore surface 17, extends axially from the inner base 15 of the socket bore 24 to approximately half the length of the socket bore, but could be either longer or shorter.

The support stake 7, shown in FIG. 4, is preferably made of a plastic or synthetic material, and is generally long, rod shaped, and tapered to a point 27, at it's lower end. The diameter of the support stake is such that it may be easily inserted, with a loose fit, within the support bracket socket 16, rotate freely, and maintain the socket in a vertical position without side-to-side leaning or wobble. The exterior of the support stake 7 contains multiple, circumferential, semi-circular depressions 8. The user will find these circumferential depressions, spaced to generally accommodate the fingers of a user, act to provide a secure means to hold the stake by the hand preventing it from slipping while inserting it into the ground.

Referring again to FIG. 4, the upper portion 21 of the support stake 7 is semi-circular to define an axially oriented surface and the tip is preferably rounded. A rounded upper tip 19 provides two independent benefits. First, it reduces the possibility of injury to the user when manually forcing the stake into the ground. This is an improvement over prior art, decoy supporting pins which are often seen with points on both ends and subject the user to potential injury when pressing the stake into the ground. Secondly, as a functional portion of the herein disclosed device, when assembled with the support bracket 6, the rounded, upper end of the stake 19 interacts with the inner top surface 15 of the support bracket socket 16. The rounded tip of the stake surface minimizes contact between the top inner surface of the support bracket socket 15, and the top of the support stake 19, minimizing friction between the two parts and allowing for a free, side-to-side, pivoting action of the support mounting bracket 6 and the attached decoy body 9.

Now again referring to the support mounting bracket 6, and the support stake 7, as shown in the horizontal sectional view 2—2 in FIG. 3. Directional stability and controlled movement of the decoy 10 is accomplished through interaction of the internal axial bore surface 17 and the axially oriented surface 21 defined by the upper portion of the stake 7. The axial bore surface 17 acts as an internal stop within the support bracket socket 16 and interacts with the axially oriented surface 21 of the support stake 7 to prevent the decoy from spinning freely, but allowing a limited turning angle. As illustrated, axial bore surface 17 is a triangular surface and support stake surface 21 is a flat surface. The illustrated configuration limits the turning angle to 90°, but any combination of included angle for a triangular surface for bore surface 17 and the semicircular angled defined by support stake surface 21 can be produced to limit movement over any range from 0 to 360° while retaining control over unconstrained rotation. When the support mounting bracket 6 is attached to the decoy 9, and placed over the supporting stake 7, the decoy is free to rotate circumferentially 45 degrees to the right and left of center. The horizontal cross section 2—2 of FIG. 3, is shown in FIGS. 6, 7, and 8, illustrating the position of the support bracket socket 16 in a full left position, neutral position, and full right position, respectively. Thus, directional stability of the decoy body 9 is maintained, while the decoy body 9 is free to turn forty five degrees to the right and left of center. This improvement over prior art provides for directional stability, allows for a natural side-to-side turning, and eliminates the need for external fins or other devices, for the commonly experienced problem of decoy spinning.

From the foregoing it will be apparent to those skilled in the art that a unique and improved, externally mounted, support and movement device is provided by the present invention. It will be understood that numerous modifications and substitutions can be had to the above-described embodiments without departing from the spirit of the herein disclosed invention. For example, an alternative to the single stake, as shown in FIG. 1, is to utilize a plastic molded two-legged stake that might more resemble an actual birds legs. A second alternative, within the spirit of this invention, is to utilize the support mounting bracket 6 for attachment of an electrically operated movement device to a bird decoy. This alternative for providing mechanical and electrically operated decoy movement would eliminate the need for screws, or other similar fasteners, as is often seen in prior art decoy movement devices, and would be a welcome improvement to those using the device. A further alternative is to modify the internal bore of the support bracket socket 16 and upper end of the support stake 21 to provide for decoy rocking, or feeding movement, rather than only side-to-side turning, as is herein described.

The embodiment were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A decoy mounting system comprising:

a ground support stake having a semi-circular top portion defining an axially oriented surface and a pointed bottom end;

a mounting bracket for connecting the ground support stake with the decoy and having a socket depending downwardly therefrom to receive the top portion of the ground support stake, where the socket defines an axially oriented bore surface effective to engage the axially oriented surface of the ground support stake to limit circumferential rotation of the mounting bracket on the ground support stake.

2. The decoy mounting system of claim 1, wherein the axially oriented surface at the top end of the ground support stake is a flat surface.

3. The decoy mounting system of claim 2, wherein the axially oriented bore surface is a triangular surface.

4. The decoy mounting system of claim 1, wherein the axially oriented bore surface is a triangular surface.

5. The decoy mounting system of claim 1, wherein the mounting bracket further comprises:

a flat rigid member mounted on the socket; and a slotted bracket mountable on the decoy for slidably receiving the flat rigid member to attach the flat rigid member to the decoy.

6. The decoy mounting system of claim 1, wherein the ground support stake defines a rounded top end for use in pushing the ground support stake into a ground location and for providing a pivot surface for the bore of the socket.

7. The decoy mounting system of claim 1, wherein the ground support stake defines a plurality of circumferential indentations located axially between the bottom pointed end and the top portion to provide a secure grip for a user inserting the ground support stake at a ground location.

8. A decoy system, comprising:

a bird shaped decoy defining a center of gravity;

a ground support stake having a semi-circular top portion defining an axially oriented surface and a pointed bottom end;

a mounting bracket for connecting the ground support stake with the decoy and having a socket depending downwardly therefrom to receive the top end of the ground support stake, where the socket defines an axially oriented bore surface effective to engage the axially oriented surface of the ground support stake to limit circumferential rotation of the mounting bracket on the ground support stake; the mounting bracket further comprising a flat rigid member mounted on the socket and a slotted bracket for slidably receiving the flat rigid member, where the slotted bracket is mounted on the decoy at a location effective to locate the center of gravity of the decoy above the socket bore to balance and support the decoy on the bracket support stake.

9. The decoy system of claim 8, wherein the decoy is formed of a soft, thin flexible material that is preformed to a selected shape or is inflatable to the selected shape.

* * * * *